United States Patent

[11] 3,624,813

| [72] | Inventor | John A. Gaylord<br>San Rafael, Calif. |
|---|---|---|
| [21] | Appl. No. | 880,771 |
| [22] | Filed | Nov. 28, 1969 |
| [45] | Patented | Nov. 30, 1971 |
| [73] | Assignee | H. Koch & Sons, Inc.<br>Corte Madera, Calif.<br>a division of Global Systems, a<br>Gulf/Western Company |

[54] WEB RELEASE DEVICE
5 Claims, 6 Drawing Figs.

[52] U.S. Cl. .................................................. 294/83 AE,
24/201, 24/230, 244/151, 294/83 A
[51] Int. Cl. .................................................. B64d 17/38,
A44b 11/00
[50] Field of Search .......................................... 24/230 LP,
230 AV, 230 AP, 230 A, 201 L, 201 R, 201 LP,
201 SL, 201 D, 201 TR, 241 PP, 241 SL; 244/151
B, 151.1; 294/83 AE, 83 AB, 83 A, 83; 85/DIG. 1

[56] References Cited
UNITED STATES PATENTS

| 2,422,839 | 6/1947 | Maskey | 294/83.1 ER UX |
| 2,940,792 | 6/1960 | Rubinstein | 294/83.1 UX |
| 3,012,810 | 12/1961 | Tenney | 294/83 |
| 3,024,592 | 3/1962 | Leaman | 85/DIG. 1 UX |
| 3,130,703 | 4/1964 | Thompson | 24/230 AP UX |
| 3,266,833 | 8/1966 | Mack | 24/241 SL UX |
| 3,331,278 | 7/1967 | Brown | 85/DIG. 1 UX |

FOREIGN PATENTS

| 87,037 | 1/1956 | Norway | 24/230 V |

*Primary Examiner*—Bernard A. Gelak
*Attorney*—George B. White

ABSTRACT: One of the webs wherein two webs are connected, is looped around a crossbar pivoted on one leg of a generally U-shaped frame, the other leg of which has a keeper hole. A bolt slideable in the tubular crossbar is initially in engagement with the keeper hole thereby to hold the webs connected. A shearpin holds the bolt in locked position. One side of the bolt is cut away to form a receptacle for a cartridge with a plunger pin in the cartridge pressed against a stop by the gases of combustion in the cartridge so as to shear the shearpin and pull the bolt into the tubular crossbar thereby to withdraw it from the keeper hole and release the web.

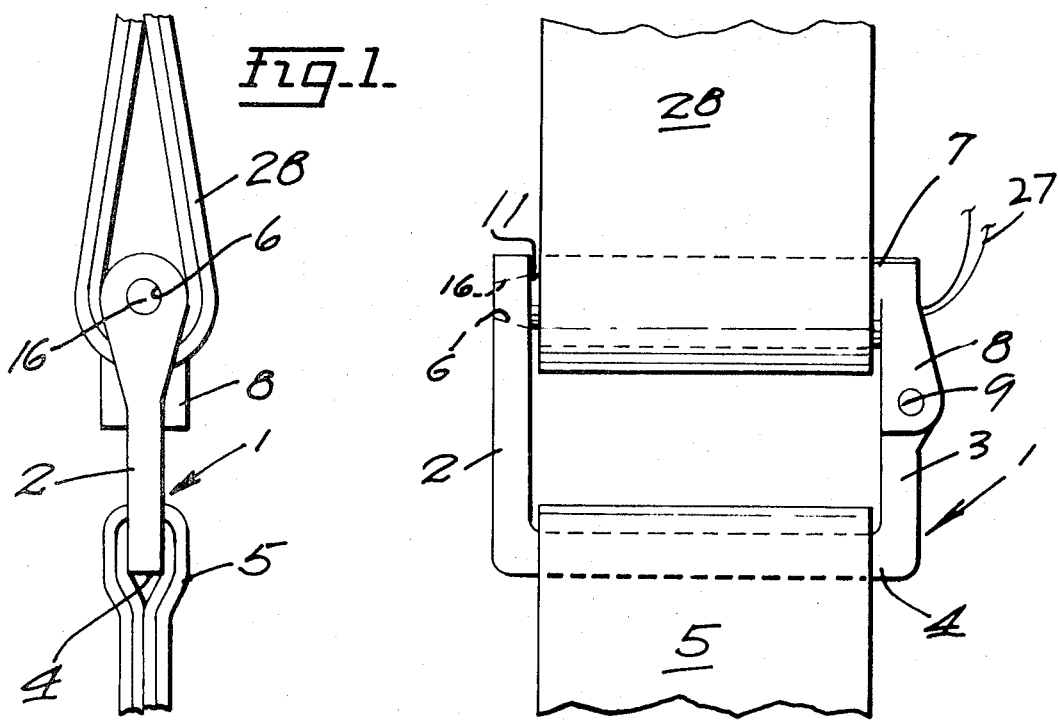
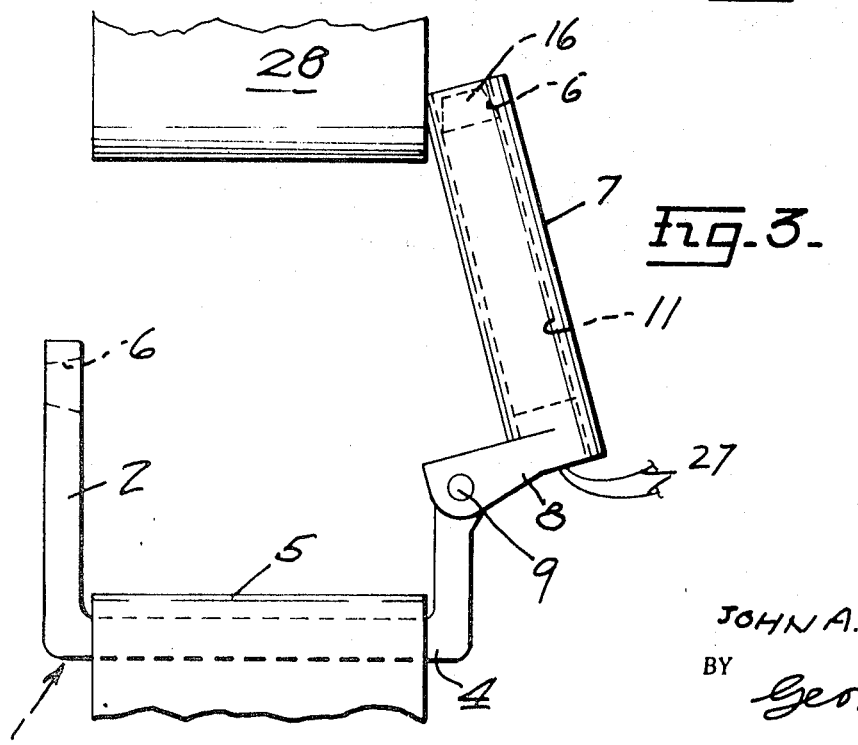

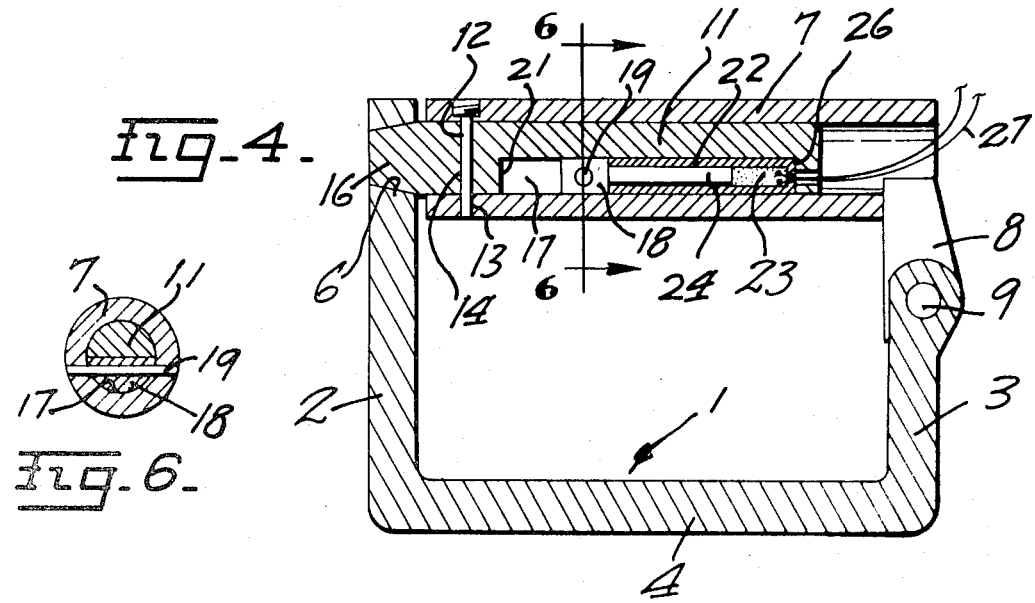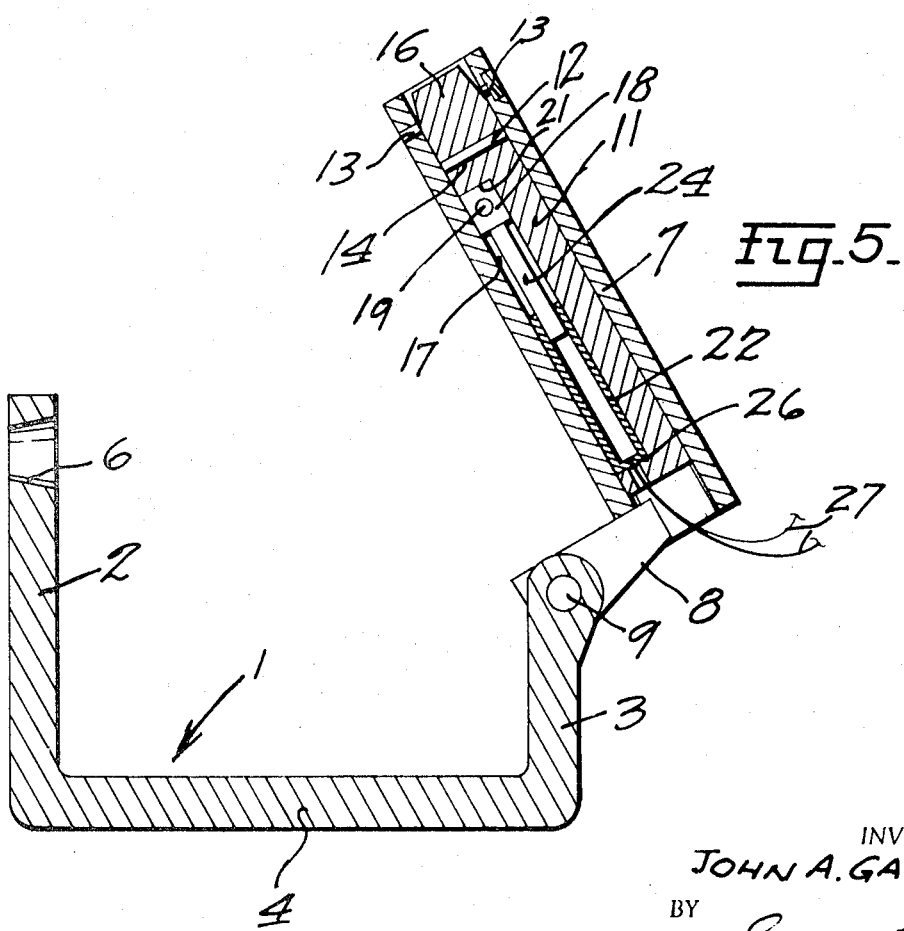

WEB RELEASE DEVICE

BACKGROUND OF THE INVENTION

Particularly in connection with webs used as risers or shrouds or connecting belts in parachute harness or the like, it is frequently essential that an automatic release be provided for certain of the webs for quick detachment from the parachute. In order to make such release automatic, a cartridge is utilized for the combustion of gases the charge in which can be fired from remote control by the suitable automatic closing of an electric circuit. The object of the invention is to render the support and connection of the webs positive up to the moment of the necessity for the release, but that at that moment speedily release the web.

DESCRIPTION OF FIGURES

FIG. 1 is a side view of the web release device.
FIG. 2 is a front view of the same in webbing connecting position.
FIG. 3 is a view showing the connecting device in web-releasing attitude.
FIG. 4 is a sectional view of the releasing device in locked position.
FIG. 5 is a sectional view of the device in web-releasing position.
FIG. 6 is a cross-sectional view taken on lines 6—6 of FIG. 4.

DETAILED DESCRIPTION

A generally U-shaped frame 1 has a longer leg 2 and a shorter leg 3 connected by a crossmember 4 on which can be looped a web 5 in the manner shown in FIGS. 1 and 2. The longer leg 2 has a frustoconical keeper hole 6 near its free end.

A web holder crossbar 7 has a bearing yoke 8 at one end thereof pivoted on a pivot shaft 9 in the top of the shorter leg 3. The yoke 8 is of such height that in the closed position of the device the crossbar 7 is axially aligned with the keeper hole 6.

The crossbar 7 is tubular. A bolt 11 is slideable in the crossbar, but it is held against sliding by a shearpin 12 extended through aligned holes 13 across the tubular crossbar 7 and the hole 14 across the bolt 11. The hole 14 is so spaced from the projecting end 16 of the bolt 11 that the shearpin 14 holds the projecting tip 16 of the bolt 11 tightly in the conical keeper hole 6.

A pocket 17 is formed on one side of the bolt 11. A stop 18 is held by a cross pin 19 in the tubular crossbar 7 spaced from the end 21 of the pocket 17 nearer to the shearpin 12. The space on the other side of the stop 18 accommodates a cartridge 22 containing a charge 23 and a plunge pin 24 bearing against the other end 26 of the pocket 17 as shown in FIG. 4. Suitable electric wires 27 are connected in a suitable electric circuit, not shown, for igniting or firing the charge 23.

In operation whenever a suitable emergency switch or the like closes the electric circuit through the primer wires 27 the combustion of gases in the cartridge 22 bear against the pin 24 and against the closed end of the cartridge 22 and against the adjacent end 26 of the pocket 17 and the reaction force so exerted shears the shearpin 12 and pushes the bolt 11 from the position shown in FIG. 4 into the position shown in FIG. 5 toward the pivot yoke 8 thereby withdrawing the conical tip 16 of the bolt 11 from the keeper hole 6. Thereupon the pull on the web 28 will swing the tubular crossmember 7 about its pivot 9 so as to release the webs 5 and 28 from each other.

This web release may be also incorporated in connection with the web connectors in which case the U-shaped frame 1 would be a part of one of the separable members of the web connector, for instance of the type shown in U.S. Pat. No. 3,330,014.

I claim:

1. In a web release device,
a web connecting frame,
a pair of spaced elements on the frame,
a web holder pivoted on one of said spaced elements and extended to the other spaced element,
releasable locking means on said holder to interlock the free end of said holder of the web holder with the other spaced element,
and gas pressure actuated means in said releasable means to release said releasable means from said other spaced elements thereby to free the web for sliding off the freed web holder,
said releasable locking means including,
a member reciprocable in said holder,
said other leg having a keeper engaged by said reciprocable member for locking said holder to said other leg,
said reciprocable member having an elongated pocket along one side adjacent said holder, said pocket being closed at its ends,
said gas pressure actuated means including,
a stop in said pocket fixed in said holder between the ends of said pocket, whereby gas pressure bearing against said stop exerts reaction force on the end of said pocket nearest to the pivoted end of said holder so as to move said reciprocable member out of said keeper thereby releasing said holder,
and means to introduce said gas pressure to act on said reciprocable member.

2. The web release specified in claim 1, and
said means to introduce gas pressure including,
a cartridge in said pocket,
a charge in the closed end of the cartridge nearer to said hinged end,
a reciprocating element in said cartridge bearing against said stop whereby said cartridge is forced away from said stop for moving said holder out of said keeper.

3. A web release device specified in claim 1, and a shear element fixed in said holder securing said reciprocable member in locked position in said holder in engagement with said keeper,
said shear element being shearable by the shearing force produced by said gas pressure for moving said reciprocable member.

4. In a web release device
a web connecting frame,
a pair of spaced elements on the frame,
a web holder pivoted on one of said spaced elements and extended to the other spaced element,
releasable locking means on said holder to interlock the free end of said holder of the web holder with the other spaced element,
and gas pressure actuated means in said releasable means to release said releasable means from said other spaced elements thereby to free the web for sliding off the freed web holder,
said web holder being tubular,
said releasable locking means including,
a bolt reciprocable in said tubular holder and a keeper in said other spaced element engageable by said bolt,
said pressure gas actuated means including,
an elongated pocket on one side in said bolt,
a stop fixed in said holder extended across said pocket spaced from both ends of said pocket so that said bolt is slideable in said holder over said stop,
a cartridge in said pocket bearing against the end of the pocket nearest to the pivoted end of said holder,
a plunger slideable in said cartridge and bearing against said stop,
and means to produce gas pressure in said cartridge for forcing said plunger against said stop and for exerting reaction force against said nearest end of said pocket, thereby to move said bolt into said tubular holder and out of said keeper.

5. The web release device specified in claim 1, and
a charge in said cartridge between said nearest pocket end and said plunger,
means to ignite said charge to produce said gas pressure, a shear element for holding said bolt locked in said keeper, said shear element being sheared by the force exerted by said gas pressure in said cartridge.

* * * * *